United States Patent [19]
Harmsen et al.

[11] 3,802,062
[45] Apr. 9, 1974

[54] PROCESS OF PRODUCING SOLDERABLE COMPOSITES CONTAINING AgCdO

[75] Inventors: Ulfo Harmsen, Pforzheim; Wolfgang S. Pöttken, Dietlingen, both of Germany

[73] Assignee: Dr. Eugen Durrwachter Doduco, Pforzheim, Germany

[22] Filed: Jan. 23, 1973

[21] Appl. No.: 325,997

[52] U.S. Cl............... 29/501, 29/504, 29/630 C, 200/166 C, 200/166 CM
[51] Int. Cl............................................. B23k 35/12
[58] Field of Search............... 29/501, 504, 630 C; 200/166 C, 166 CM

[56] References Cited
UNITED STATES PATENTS

| | | | |
|---|---|---|---|
| 1,658,713 | 2/1928 | Fuller | 29/630 C |
| 2,196,302 | 4/1940 | Hensel et al. | 200/166 C |
| 3,078,562 | 2/1963 | Gwyn, Jr. et al. | 29/501 X |
| 3,288,971 | 11/1966 | Polleys | 200/166 C |
| 3,545,067 | 12/1970 | Haarbye et al. | 29/504 X |
| 3,571,546 | 3/1971 | Sedlak | 200/166 C |
| 3,596,030 | 7/1971 | Shibata | 200/166 C |
| 3,688,067 | 8/1972 | Shibata | 200/166 C |

FOREIGN PATENTS OR APPLICATIONS

| | | | |
|---|---|---|---|
| 647,653 | 8/1962 | Canada | 29/501 |

*Primary Examiner*—J. Spencer Overholser
*Assistant Examiner*—Ronald J. Shore

[57] ABSTRACT

An assembly is provided which comprises an AgCd layer, a solderable layer consisting essentially of Ag, and an Ag-Cu alloy layer disposed between and adjoining said AgCd layer and said solderable layer. The assembly is subjected to welding under heat and pressure to cause said Ag-Cu allow layer to form a semiplastic $(s + \alpha)$ phase. The cadmium in the assembly is then oxidized to produce a solderable silver-cadmium oxide composite for use in making contacts.

7 Claims, No Drawings

PROCESS OF PRODUCING SOLDERABLE COMPOSITES CONTAINING AGCDO

This invention relates to a process of producing solderable silver-cadmium oxide composites for use in making contacts, which process comprises an internal oxidation of silver-cadmium alloys.

It is known that silver-cadmium oxide composites have a very little tendency to weld; they are used on a large scale as contact coverings in switchgear for high switching rates and small or medium loads. The composites are produced mainly by an internal oxidation of silver-cadmium alloys (British Patent Specification No. 611,813 (1948); H. Schreiner, Pulvermetallurgie elektrischer Kontakte, Springer-Verlag, Berlin, Gottingen, Heidelberg, 1964, pp. 166–165).

It is also known, however, that composites comprising silver and admixtures of metal oxide cannot readily be soldered because the solder cannot properly wet the surface (H. Schreiner, Pulvermetallurgie elektrischer Kontakte, Springer-Verlag, Berlin, Gottingen, Heidelberg, 1964, page 221). To enable the use of these composites as soldered contact coverings, the silver-metal oxide layer must be adjoined by a layer which is free of oxide and can be soldered. For instance, a solderable AgCdO composite can be produced, e.g., by an internal oxidation of an Ad-CdO alloy which has been provided with a silver layer by the known hot roll bonding process or the known process of welding under heat and pressure, in which a liquid phase is not formed, (German Patent Specification No. 1,122,812) or by an internal oxidation of a silver alloy which has been clad with a hard solder (German Patent Specification No. 1,090,484). Another known process which enables a soldering of AgCdO composites comprises an oxidation of AgCd alloy sheets on one side only to a depth of about 70 percent of the total thickness. The remaining layer, which is free of oxide, can then be soldered satisfactorily (German Patent Specification No. 1,533,235).

In the hot roll bonding process and in the welding of plates under heat and pressure without formation of a liquid phase (German Patent Specification No. 1,122,812), difficulties arise in that a non-satisfactory bonding often results in a strong enrichment of CdO in the interphase and because the internal oxidation results in a diffusion of cadmium into the unbonded areas, where the cadmium is oxidized to form cadmium oxide.

With sheet metal that has been subjected to hot roll bonding, there is also a danger of an oxidation of the AgCd sheet at its surface adjoining the silver layer so that the composite is not properly bonded.

It has now been found that these defects in the interphase, such as a surface oxidation of the AgCd sheet and an enriching of CdO in the interphase, can be eliminated according to the invention in a surprisingly simple manner. In the process of the invention, a cold plate of an AgCd alloy, a plate of an AgCu alloy, and a silver plate are compressed under a pressure of 0.5–5 metric tons per square centimeter applied by a hydraulic press, and the resulting composite is subsequently welded at 800° C. under a pressure of 0.5–5 metric tons per square centimeter whereby the AgCu alloy is transformed into a semiplastic $(s + \alpha)$ phase. The resulting bonded composite may then be rolled to a small thickness and subjected to internal oxidation. There will be no blisters or defects in the interphase.

The Cu content of the AgCu alloy is preferably between 9 percent and 25 percent by weight.

Example

An AgCd alloy containing 12 percent cadmium and an admixture of 0.5 percent Sn, 0.5 percent Sb and 0.3 percent Ca is melted and cast to form an ingot, which is planed to form a plate of 190 × 130 × 50 millimeters. The surface to be bonded is brushed clean. This AgCd plate is placed on the lower platen of the hydraulic press. An AgCu sheet metal element is placed on the brushed surface and an Ag sheet metal element, which has been soft-annealed and brushed clean, is placed on the AgCu sheet metal element. The upper platen of the hydraulic press is then caused to apply a pressure of 1 metric ton per square centimeter to said pile of layers. When the press has been opened, the layers pressed together are wrapped in brass foil and are welded at 820° C. and under a pressure of 1 metric ton per square centimeter.

The welded slab is rolled down to a thickness of 30 millimeters, annealed in a salt bath and subjected to further rolling passes involving a reduction of about 50 percent each until a thickness of 2 millimeters has been reached. Plates are stamped from the strip and are subjected to internal oxidation for 3 days at 700° C. in an oxygen atmosphere under a pressure of 3 kilograms per square centimeter above atmospheric pressure. After the internal oxidation, no blisters on the silver layer nor oxide streaks and enriched oxides in the interphase can be detected. After a breaking test, the silver layer cannot be pulled off.

What is claimed is:

1. A process of manufacturing a solderable composite which comprises AgCdO, said process comprising
    providing an assembly which comprises a AgCd layer, a solderable layer consisting essentially of Ag, and a Ag-Cu alloy layer disposed between and adjoining said AgCd layer and said solderable layer,
    welding said assembly under heat and pressure to cause said Ag-Cu alloy layer to form a semiplastic $(s + \alpha)$ phase, and
    oxidizing the cadmium in the welded assembly.

2. A process as set forth in claim 1, in which said solderable layer consists of a silver alloy.

3. A process as set forth in claim 1, in which said Ag-Cu alloy layer contains 9–25 percent copper.

4. A process as set forth in claim 1, in which said cadmium is oxidized by heating said welded assembly at a temperature of 600° C. to about 800° C. in an atmosphere containing oxygen under a pressure of 1–5 kilograms per square centimeter above atmospheric pressure.

5. A process as set forth in claim 1, in which said cadmium is oxidized by heating said welded assembly at a temperature of about 800° C. in an atmosphere containing oxygen under a pressure of 1–5 kilograms per square centimeter above atmospheric pressure.

6. A process as set forth in claim 1, in which said cadmium is oxidized by heating said welded assembly at a temperature of 600° C. to about 800° C. in an atmosphere containing oxygen under a pressure of 2 kilograms per square centimeter above atmospheric pressure.

7. A process as set forth in claim 1, in which said cadmium is oxidized by heating said welded assembly at a temperature of about 700° C. in an oxygen atmosphere under a pressure of 3 kilograms per square centimeter above atmospheric pressure.

* * * * *